United States Patent [19]
Liou

[11] Patent Number: 5,169,257
[45] Date of Patent: Dec. 8, 1992

[54] ANGLE ADJUSTABLE JOINT

[76] Inventor: Shuen-Yi Liou, No. 11-1, Lane 249, Sec. 2, Chung Hsin Road, Ta Li Hsiang, Taichung Hsien, Taiwan

[21] Appl. No.: 903,970

[22] Filed: Jun. 26, 1992

[51] Int. Cl.⁵ .............................................. F16C 11/04
[52] U.S. Cl. ...................................... 403/95; 403/97; 403/330; 297/356; 297/366; 16/333
[58] Field of Search .................. 403/91-102, 403/330; 16/333, 334, 343; 297/356, 366, 367, 379; 248/291; 182/104, 27

[56] References Cited
U.S. PATENT DOCUMENTS

| | | | |
|---|---|---|---|
| 3,232,136 | 2/1966 | Bahmüller | 403/93 X |
| 3,779,655 | 12/1973 | Toyota | 403/93 |
| 4,474,264 | 10/1984 | Krause | 16/334 X |

Primary Examiner—Andrew V. Kundrat
Assistant Examiner—Harry C. Kim
Attorney, Agent, or Firm—Bacon & Thomas

[57] ABSTRACT

An angle adjustable joint for use in furnitures which is consisted of a locating member, a driven member pivoted to the locating member, two brake members pivotably fastened inside the driven member on the same axis and controlled by two torsional springs to hook in teeth on the locating member, and a return plate pivotably fastened inside the locating member for return control. Rotating the driven member on the locating member causes the brake members to alternatively change their engagement with the teeth on each ratchet plate from one to another permitting the driven member to be positioned at either of a plurality of angles relative to the locating member.

2 Claims, 5 Drawing Sheets

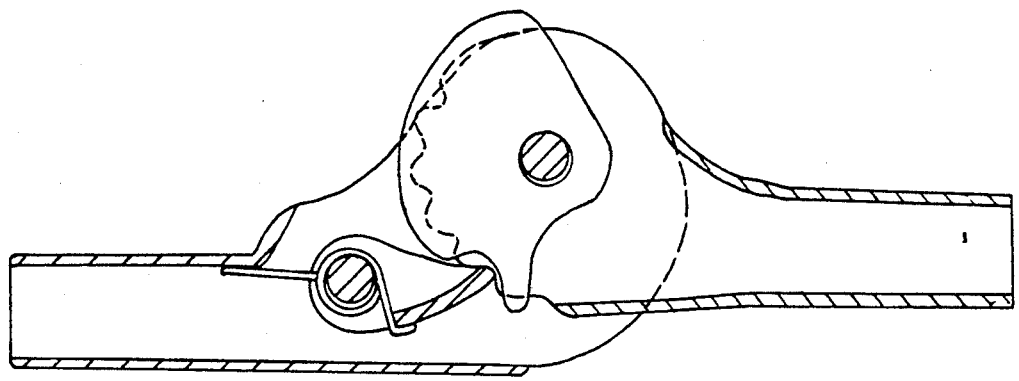
PRIOR ART FIG. 1
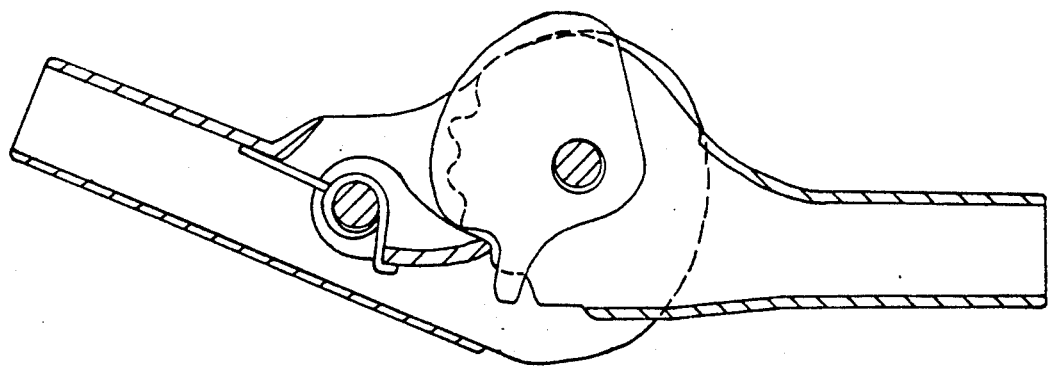
PRIOR ART FIG. 1A

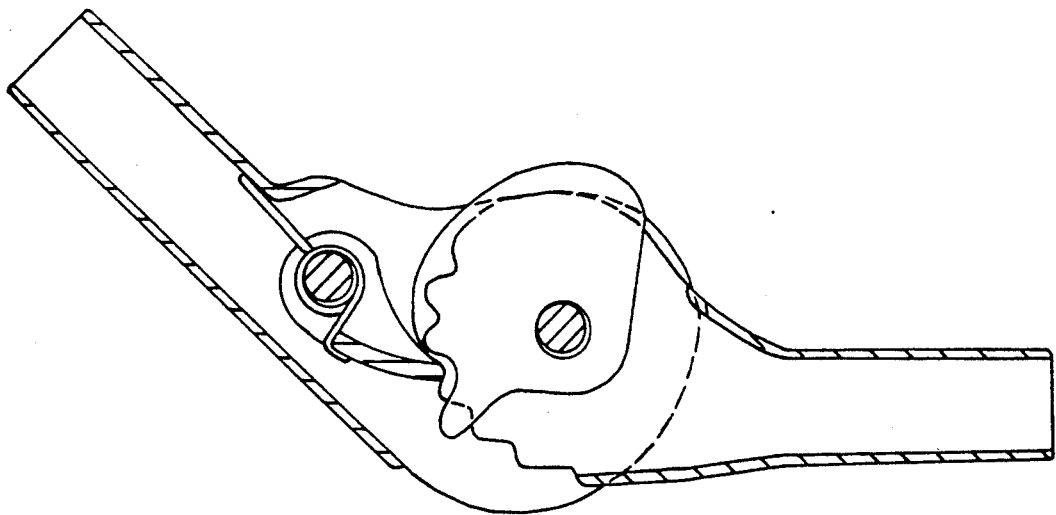
PRIOR ART FIG. 1B
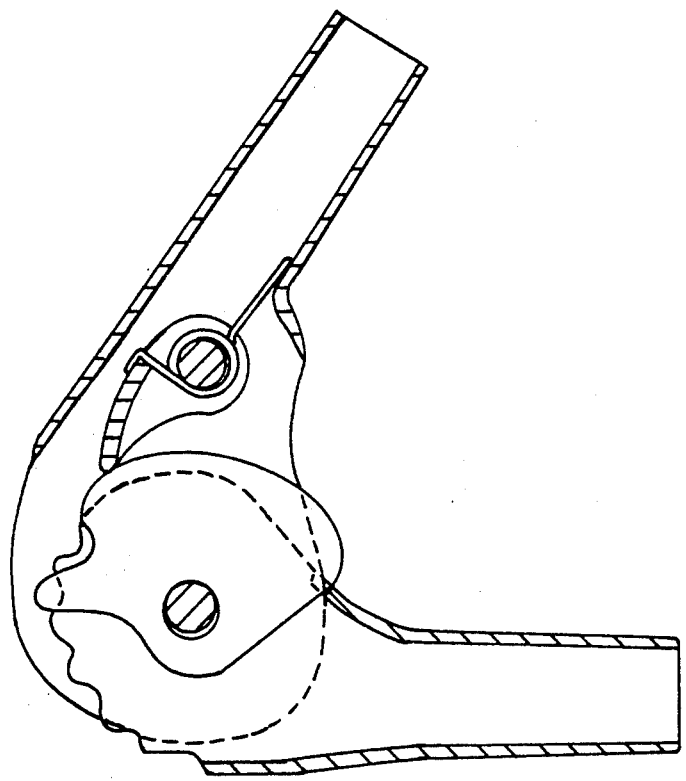
PRIOR ART FIG. 1C

ANGLE ADJUSTABLE JOINT

BACKGROUND OF THE INVENTION

The present invention relates to an angle adjustable joint for use in furnitures which can be conveniently adjusted from one position to another and firmly retained at any of a variety of angles.

In furnitures, a joint may be fastened between two parts so that they can be rotated with one against the other. FIG. 1 illustrates a prior art joint used in furnitures. This joint is consisted of a locating member, a driven member, a brake member, a torsional spring, and a return plate. The driven member is pivoted to the locating member. The brake member is supported on the torsional spring and rotated by the driven member to engage into either pitch on a series of teeth on each of two parallel ratchet plates on one end of the locating member. Rotating the driven member on the locating member causes the brake member to change its engagement with the teeth on the locating plate from one to another permitting the driven member to be positioned at either of a plurality of angles relative to the locating member (see FIGS. 1A, 1B and 1C). In this structure of joint, each ratchet plate of the locating member has only four teeth for adjusting the angular position of the driven member relative to the locating member, and therefore the joint can only be adjusted and positioned at either of five angles including horizontal and vertical angles. The pitch between each two adjacent angles is about 22 angle. This wide pitch can not satisfy all consumers. However, simply increasing the number of teeth will reduce the bearing strength of each tooth, and the teeth may be damaged easily. Furthermore, increasing the number of teeth will also increase the tooling charge. If to reinforce the bearing strength of the teeth by increasing the thickness of the ratchet plates, the manufacturing cost of the joint will be greatly increased.

SUMMARY OF THE INVENTION

The present invention has been accomplished under the aforesaid circumstances. It is therefore an object of the present invention to provide an angle adjustable joint which can be conveniently adjusted from one position to another and firmly retained at any of a variety of angles. It is another object of the present invention to provide angle adjustable joint which provides high bearing strength. It is still another object of the present invention to provide an angle adjustable joint which is stable in operation. According to the preferred embodiment of the present invention, an angle adjustable joint is consisted of a locating member, a driven member having two parallel bearing plates pivoted to two parallel ratchet plates on one end of the locating member, two brake members pivotably fastened inside the driven member on the same axis and controlled by two torsional springs to hook in teeth on the two parallel ratchet plates of the locating member, and a return plate pivotably fastened inside the locating member for return control. Because two brake members are used and pivotably received with one inside another, the bearing strength of the angle adjustable joint is reinforced, and the number of angles for choice is doubled. According to another aspect of the present invention, the parallel bearing plates have each a circular recess curved inwards for guiding the rotary motion of the two parallel bearing plates on the two parallel ratchet plates smoothly and stably.

BRIEF DESCRIPTION OF THE DRAWINGS

FIG. 1 illustrates an angle adjustable joint according to the prior art;

FIGS. 1A and 1B illustrates the operation of the angle adjustable joint of FIG. 1 in changing its position from one angle to another;

FIG. 1C illustrates the operation of the angle adjustable joint of FIG. 1 in returning to its original horizontal position;

DETAILED DESCRIPTION OF THE PREFERRED EMBODIMENT

Figure 2:
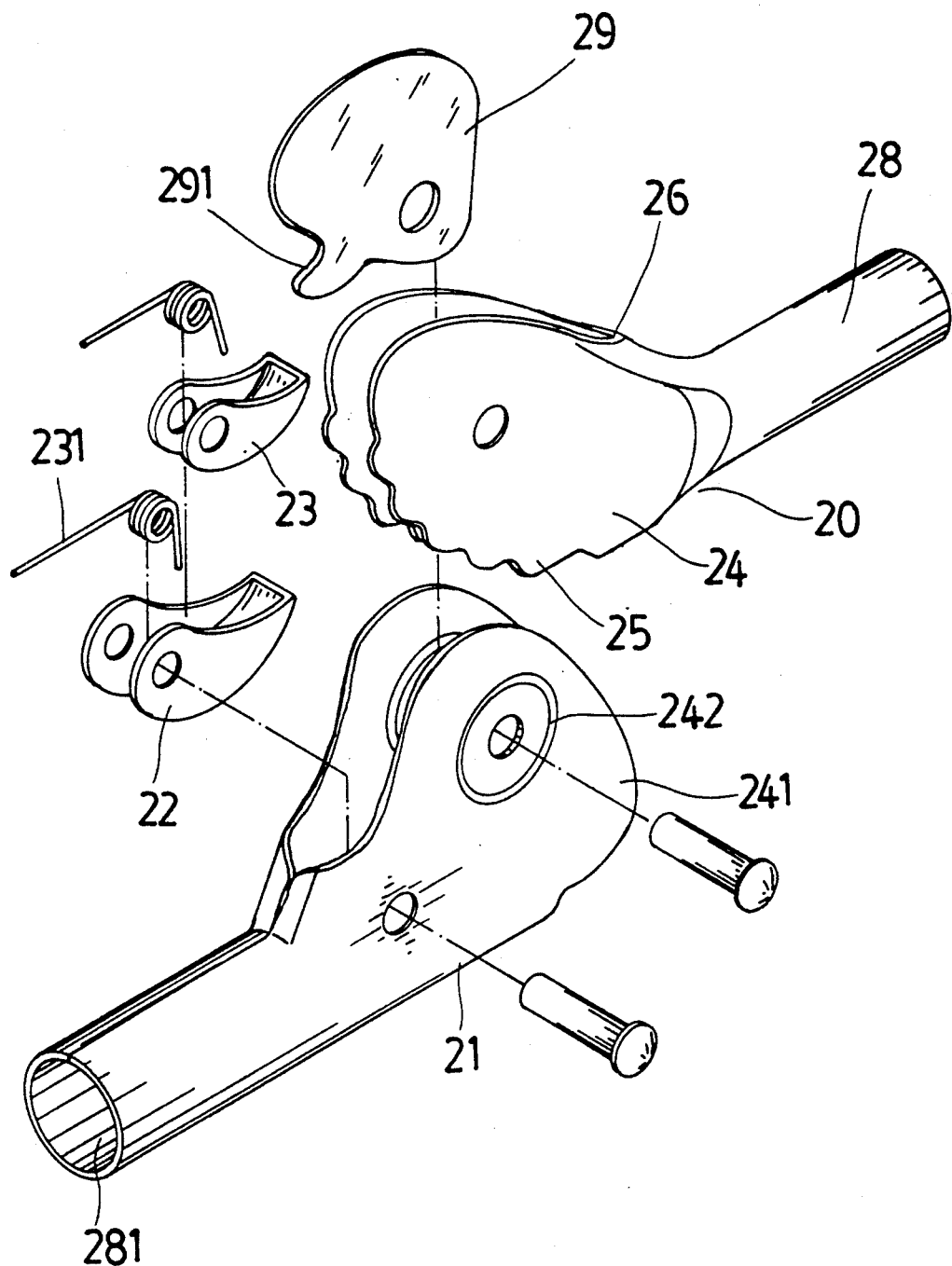
FIG. 2 is an exploded view of an angle adjustable joint embodying the present invention.
Figure 3:
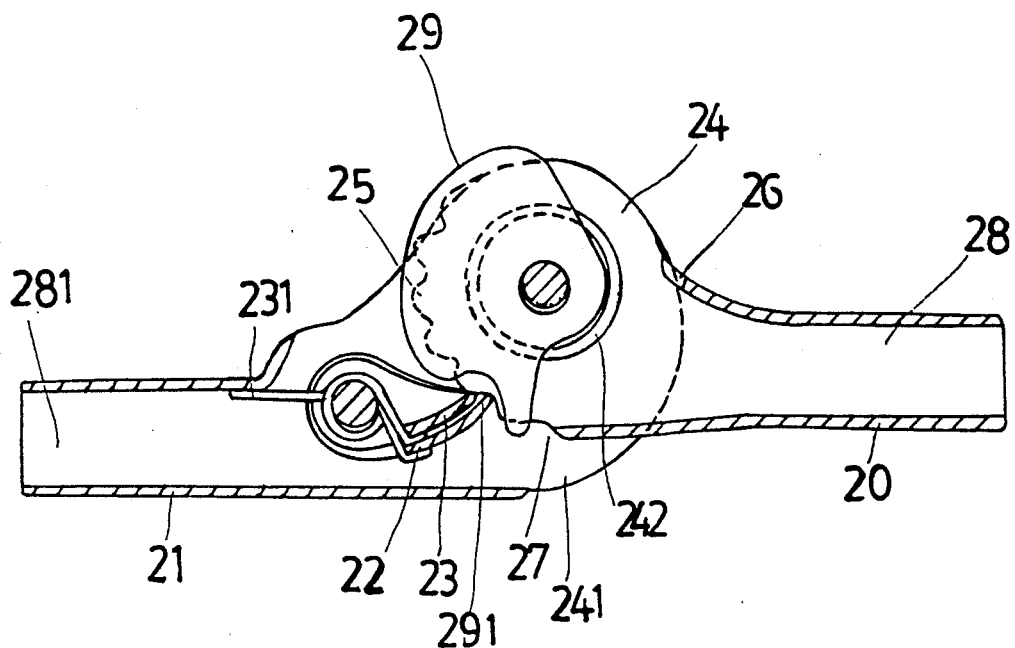
FIG. 3 is a cross section of the angle adjustable joint of FIG. 2 taken in longitudinal direction when it was fixed at horizontal position.
Figure 3A:
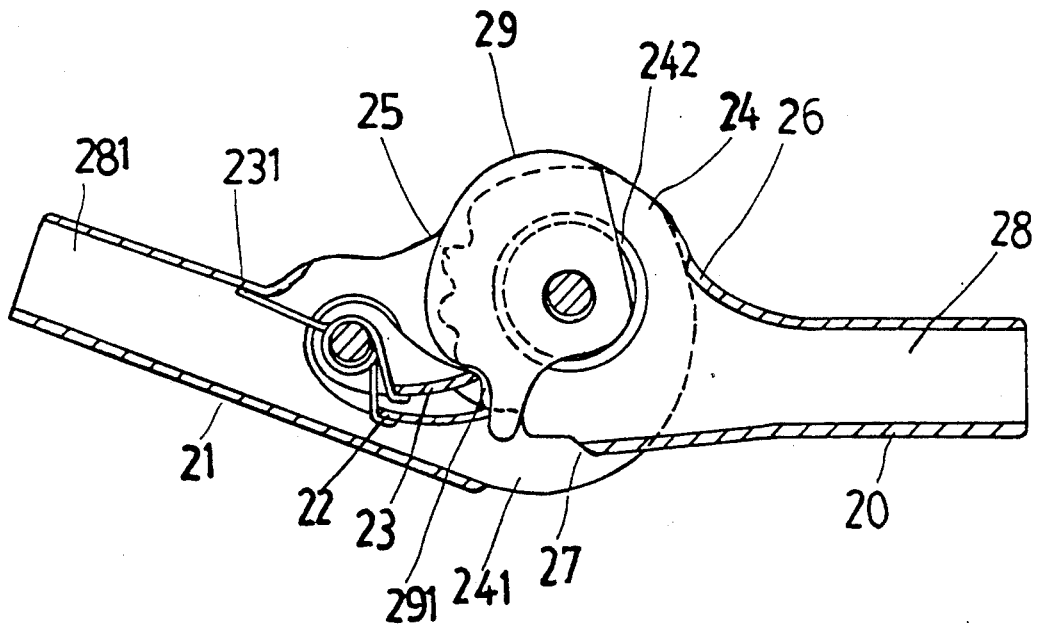
FIGS. 3A and 3B illustrates the operation of the angle adjustable joint of FIG. 2 in changing its position from one angle to another.
Figure 3B:
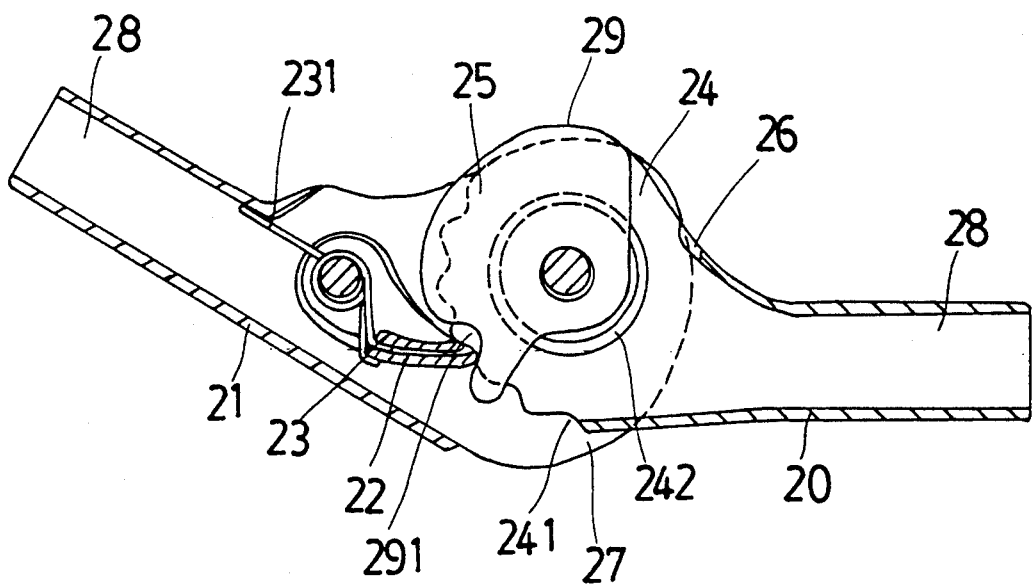

Referring to FIGS. 2 and 3, a joint as constructed in accordance with the present invention is generally comprised of a locating member 20, a driven member 21, and two brake members 22,23. The locating member 20 has two parallel ratchet plates 24 on one end with an upper U-channel 26 and a lower U-channel 27 defined therebetween, and a tube 28 on an opposite end. The ratchet plates 24 of the locating member 20 have each at least four teeth 25 along the respective peripheral edge. The driven member 21 has two parallel bearing plates 241 on one end to support the parallel ratchet plates 24 of the locating member 20, and a tube 281 on an opposite end. The parallel bearing plates 241 of the driven member 21 have each a circular recess 242 for pivoting the two parallel ratchet plates 24 of the locating member 20 through a rivet joint. The brake members 22,23, are each made in the shape of a U-hook pivotably fasted inside the driven member 21 between the two parallel bearing plates 241 through a rivet joint and controlled by a respective torsional spring 231 to hook in the teeth 25 of the ratchet plates 24. The brake members 22,23 are not equal in size. The smaller brake member 23 is pivotably secured inside the bigger brake member 22 on an eccentric location. There is also provided a return plate 29 pivotably fastened inside the locating member 20 between the two parallel ratchet plates 24 through a rivet joint. The return plate 29 has a notch 291 on the bottom for receiving the brake members 22,23. When assembled, as shown in FIG. 3, the brake members 22,23 are controlled by the respective torsional springs 231 to hook in the teeth 25 on the two parallel ratchet plates 24 of the locating member 20 causing the locating member 20 and the driven member 21 to be maintained in horizontal position, and the return plate 29 is stopped in the lower U-channel 27 at one end to hold the respective hooked front end of the brake members 22, 23 in the notch 291, and therefore the brake members 22,23 are stopped by the return plate 29 and will not disengage from the teeth 25 on the two parallel ratchet plates 24.

The operation of the joint is outlined hereinafter with reference to FIGS. 3, 3A, 3B and 3C. Before operation, the joint is fixed in a first angular position, namely, in horizontal position as shown in FIG. 3. Lifting the tube 281 of the driven member 21 and rotating it relative to the locating member 20 through approximately 11 degrees causes the smaller brake member 23 to disengage from each first tooth on the ratchet plates 24 and mesh with each second tooth, and therefore the joint is fixed in a second angular position (see FIG. 3A). Continuously rotating the driven member 21 relative to the locating member 20 causes the brake members 22,23 to disengage from each second tooth on the ratchet plates 24 and mesh with each third tooth (see FIG. 3B). By means of the aforesaid procedure, the driven member 21 can be moved from 0 degree (horizontal position) and fixed at either 11 22 34 45 56 68 79 or 90 degrees relative to the locating member 20.

Figure 3C:
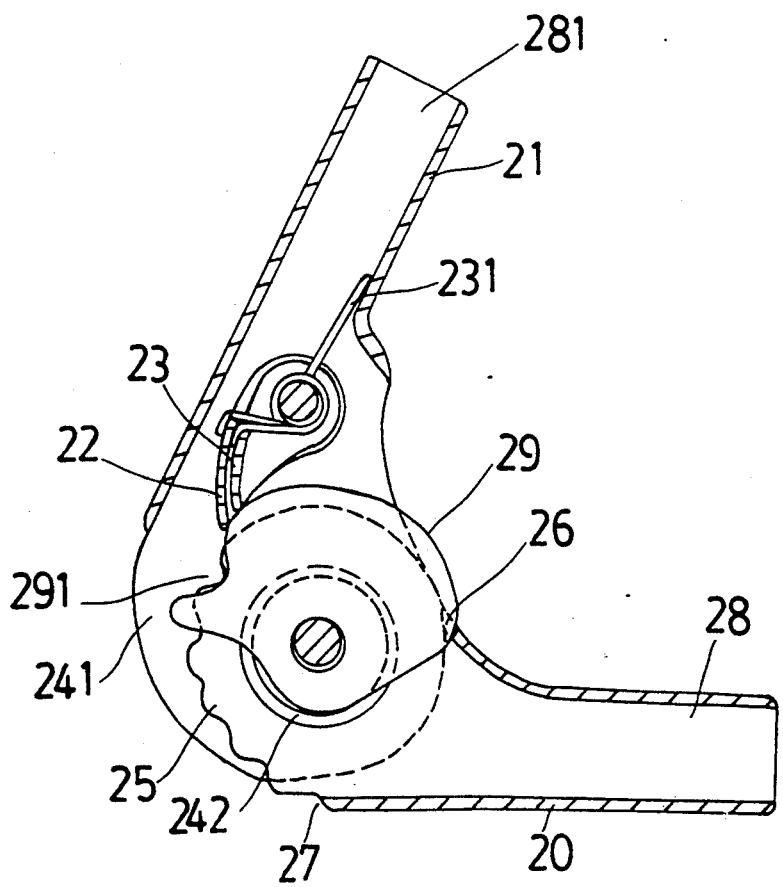
FIG. 3C illustrates the operation of the angle adjustable joint of FIG. 2 in returning to its original horizontal position.

The driven member 21 can be conveniently moved from either angular position to horizontal position by means of the control of the return plate 29. As illustrated in FIG. 3C, rotating the driven member 21 on the locating member 20 over 90 degrees causes the return plate 29 to be stopped in the upper U-channel 26 at one end. Once the return plate 29 has been stopped in the upper U-channel 26 at one end, continuously rotating the driven member 21 on the locating member 20 causes the brake members 22,23 to disengage from the teeth 25 on the ratchet plates 24 plate 29, and therefore the driven member 21 can be effortlessly turned back into original horizontal position. When returned to horizontal position, the return plate 29 is stopped in the lower U-channel 27 at one end to hold the respective hooked front end of the brake members 22,23 in the notch 291 again. Furthermore, the design of the circular recess 242 on each bearing plate 241 permits the two parallel bearing plates 241 to be rotated on the two parallel ratchet plates 24 smoothly without causing vibration, and therefore the brake members 22,23 are maintained in mesh with the teeth 25 on the ratchet plates 24.

I claim:

1. A joint comprising:
   - a locating member having two parallel ratchet plates on one end with an upper U-channel and a lower U-channel defined therebetween, and a tube on an opposite end, said ratchet plates having a series of teeth along a respective peripheral edge;
   - a driven member having two parallel bearing plates on one end respectively pivoted to said two parallel ratchet plates by a first pin, and a tube on an opposite end;
   - two brake members pivotably fastened inside said driven member between said two parallel bearing plates by a second pin, said brake members being each made in the shape of a U-hook having a hooked front end hooked in the teeth on said two parallel ratchet plates;
   - two torsional springs mounted on said second pin to give a pressure on said brake members respectively, said torsional springs having each one end stopped against the inside surface of the tube of said driven member and an opposite end stopped against a respective brake member;
   - a return plate revolvably mounted on said first pin and stopped in said lower U-channel at one end thereof to hold said brake members in a notch of said return plate permitting the hooked front end of said brake members to be maintained in mesh with the teeth on said two parallel ratchet plates; and
   - wherein rotating said driven member on said locating member causes said brake members to alternatively change their engagement with the teeth on each ratchet plate from one to another permitting said driven member to be positioned at either of a plurality of angle relative to said locating member.

2. The joint according to claim 1, wherein said parallel bearing plates have each a circular recess curved inwards around said first pin for guiding a rotary motion of said two parallel bearing plates on said two parallel ratchet plates.

* * * * *